United States Patent [19]

Siryj et al.

[11] 4,433,410
[45] Feb. 21, 1984

[54] PROTECTIVE CARTRIDGE FOR OPTICAL DISCS

[75] Inventors: Bohdan W. Siryj, Cinnaminson; Angelo G. Lazzery, Oaklyn, both of N.J.

[73] Assignee: RCA Corporation, New York, N.Y.

[21] Appl. No.: 393,605

[22] Filed: Jun. 30, 1982

[51] Int. Cl.³ .................... G11B 17/04; G11B 23/02; B65D 85/57
[52] U.S. Cl. .................................. 369/291; 206/312; 206/313; 369/77.2
[58] Field of Search ............... 369/289, 290, 291, 292, 369/77.2; 206/312, 309, 313, 444; 360/133

[56] References Cited

U.S. PATENT DOCUMENTS

| | | | |
|---|---|---|---|
| 2,285,139 | 6/1942 | Andres | 369/289 |
| 3,416,150 | 12/1968 | Lindberg | |
| 4,097,895 | 6/1978 | Spong | 358/128 |
| 4,138,703 | 2/1979 | Stave et al. | 360/133 |
| 4,216,511 | 8/1980 | Bilek | 360/133 |
| 4,222,071 | 9/1980 | Bell | 358/128.5 |
| 4,274,119 | 6/1981 | Hayward et al. | 360/97 |
| 4,277,810 | 7/1981 | Helmisch | 206/444 |
| 4,278,258 | 7/1981 | Fujita et al. | 206/309 |
| 4,327,831 | 5/1982 | Inaba et al. | 206/313 |

FOREIGN PATENT DOCUMENTS 122272 9/1980 Japan ....................... 206/312

OTHER PUBLICATIONS

U.S. patent application Ser. No. 316,659 (Reno) filed Oct. 30, 1981.

*Primary Examiner*—Steven L. Stephan
*Attorney, Agent, or Firm*—J. S. Tripoli; C. L. Maginniss

[57] ABSTRACT

A protective cartridge is provided for a disc record used in an optical playback system. The protective cartridge is provided with finger members to suspend the disc record in the cavity of the cartridge so that the information bearing surfaces of the disc record do not touch the inside surfaces of the cartridge. When the record package is in storage, the finger members are biased to engage the outside rim of the disc record. Tapered pins provided on the optical player disengage the finger members to permit the disc record to rotate in the optical player.

10 Claims, 4 Drawing Figures

PROTECTIVE CARTRIDGE FOR OPTICAL DISCS

The Government has rights in this invention pursuant to Contract No. F30602-81-C-0138 awarded by the Department of Air Force.

The present invention relates to record disc systems for use in recording and retrieving information from a disc record and, more particularly, to a cartridge system for protecting the information bearing surfaces of a disc record.

High density optical recording systems which may be used for recording and playing back information are known in the prior art. For example, U.S. Pat. No. 4,097,895 entitled, "MULTI-LAYER OPTICAL RECORD" issued to F. W. Spong on June 27, 1978, describes an optical disc record/playback system wherein data is recorded in the form of pits in an absorptive coating on the surface of an optical disc by focusing a high intensity light beam on the surface. In the Spong system, approximately $10^{11}$ bits of information can be stored on one side of a disc-shaped record medium having a 30 cm. diameter.

In optical recording systems involving high density information records, such as the Spong system, dust or other debris on the information bearing surface of the disc record may adversely affect the systems operation. Accordingly, it is desirable to provide a disc/cartridge combination wherein the disc record is enclosed in a protective cartridge.

A problem can exist when the disc is enclosed in a protective cartridge. If the information bearing surfaces of the disc record contact the inside surfaces of the protective cartridge information surfaces may be scratched or damaged. For high density optical systems such as Spong surface scratches may adversely affect the recording or recovery of the data.

A cartridge equipped to hold the disc record in a suspended state such that the information bearing surfaces do not contact the cartridge walls must also be equipped to permit the disc record to rotate freely during a recording or reading operation.

In accordance with the principles of the present invention, a protective cartridge is provided for a disc record. The cartridge protects the information bearing surfaces of the disc record from handling damage, dust or other debris and is provided with a plurality of holding means which support the disc in the middle of the cartridge cavity such that the information bearing surfaces of the disc do not touch the inside surfaces of the cartridge.

In accordance with another principle of the present invention the holding means are provided to enable easy release of the disc record during recording/retrieving cycles.

According to the invention the disc record is freed within the cartridge by a single motion, i.e., by placing the cartridge/disc in the read/record station of the optical player. Further, the release mechanism, mounted in the read/record station, is used to align the cartridge assembly in the player mechanism.

In accordance with one aspect of the present invention a record package combination is provided. The combination includes a disc record and an enclosure for protecting the information bearing surfaces of the disc record. The enclosure has a cavity for housing the disc record. A plurality of apertures of a predetermined shape are formed through the cartridge. The combination further includes a plurality of means for holding the disc record such that the disc record is suspended in the cavity. The holding means retains the disc record such that the information bearing surfaces are spaced from the side surfaces of the enclosure. Thus, the information bearing surfaces are not scratched by contacting the side surfaces of the enclosure. Each of the plurality of holding means is slidably positioned in the enclosure and biased to engage the outside rim of the record disc such that the record disc is suspended in the cavity. Further, each of the plurality of holding means has an aperture of the predetermined shape formed therethrough. Respective ones of the plurality of apertures formed in the holding means is offset with respect to respective ones of the plurality of apertures formed in the enclosure when the plurality of holding means engage the outside rim of the record disc. The player apparatus which is used for recording and retrieving the information on the information bearing surface of the disc record is provided with pin means for sliding the plurality of holding means to disengage the record disc. The pin means engage the record package such that respective ones of the plurality of apertures formed in the holding means are aligned with respect to respective ones of the plurality of apertures formed in the enclosure. Thus, when the pin means engage the record package the holding means disengage from the outside rim of the record disc to permit the record disc to rotate within the cavity.

Other features and advantages of the invention will be more fully understood from the following detailed description of the preferred embodiment, the appended claims and the accompanying drawing in which:

Figure 1:
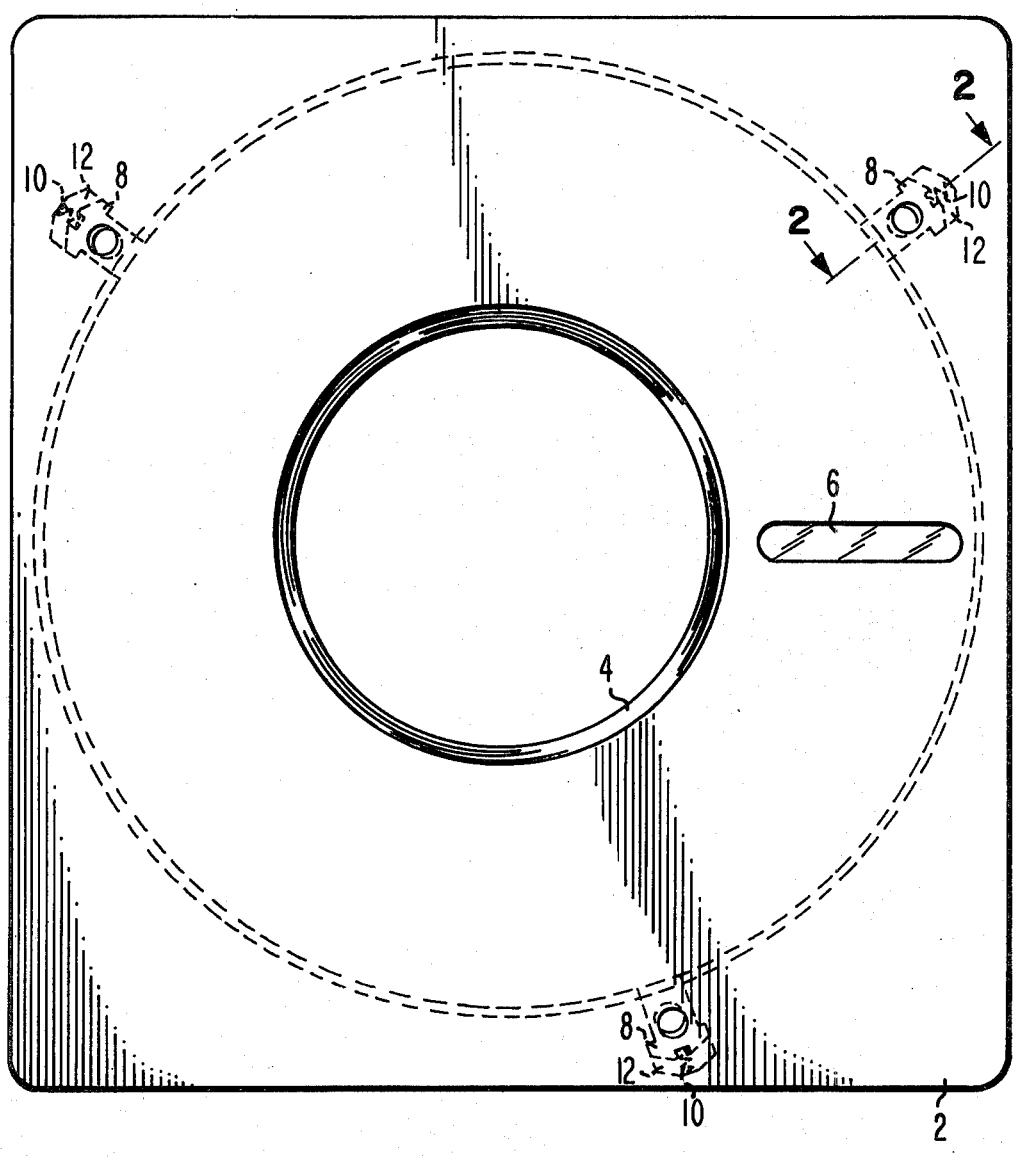
FIG. 1 is a plan view of a protective cartridge having a disc record enclosed therein.

FIG. 1 is a plan view of a protective cartridge 2 suitable for use with a disc record 4. Cartridge 2 provides dust and debris protection for the information bearing surfaces of the optical disc record 4. The disc record may be used in an optical record/playback system of a type described in U.S. patent application Ser. No. 316,659, entitled "MULTI-BEAM OPTICAL RECORD AND PLAYBACK APPARATUS" filed for C. W. Reno on Oct. 30, 1981. In accordance with the Reno system a light beam from a high power laser is split into a plurality of beams and focused onto the information surface of a disc record. In most optical systems, recording is achieved when the intensity of the focused light bean is of sufficient magnitude to effect ablation of the recording layer on the surface of the disc record. Illustratively, the disc record in this system may be of a type described in U.S. Pat. No. 4,222,071, entitled "INFORMATION RECORD" issued on Sept. 9, 1980 to A. E. Bell. In accordance with an ablation recording technique the material of the recording layer is elevated to an ablation temperature. The material vaporizes or melts forming a pit in the recording layer of the disc record. With suitable modulation of the intensity of the light beam in accordance with the recording signal, as successive regions of the disc record pass through the light beam path, an information track may be formed comprising pits in regions where the material is ablated separated by undisturbed regions of the recording layer (that were not subject to exposure by the high intensity beam).

In the playback mode the intensity of the light source is set at a constant level, which is below the recording level. The light beam follows the previously described information track on the disc record surface. The intensity of the light falling upon a photodetector alternates between a minimum level and a maximum level as the succesive regions of the information track pass through the path of the focused beam. The output of the photodetector comprises a signal that varies in consonance with the pit edge spacing variations passing through the focused beam path. The output of the photodetector may be applied to suitable signal processing circuitry for recovering the information recorded on the disc record surface.

The light beam is focused through window 6 in cartridge 2 to impinge on the information surface of disc record 4. To protect the surface of disc record 4 window 6 may be provided with a clear plastic or glass plate through which the playback light beam passes. In some optical systems the disc record may be provided with recording surfaces on both sides and, for this type of system, window 6 may be provided on both sides of cartridge 2.

According to the present invention cartridge 2 is equipped with a plurality (e.g., 3) spring loaded finger members 8. Finger members 8 are biased by springs 10 located in cavity 12 to press against the outside rim of disc record 4 when the record package is in storage.

Figure 2:
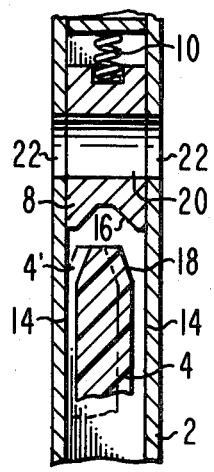
FIG. 2 is a cross-sectional side view of a portion of the protective cartridge and disc record taken across section lines 2—2 of FIG. 1.

Referring to FIG. 2 a cross-sectional view through lines 2—2 of FIG. 1 is shown. Disc record 4 is shown in phantom. The outside rim of disc 4' is free to translate so that the information surfaces of disc record 4' may contact the inside surfaces 14 of cartridge 2. Contact between the information surfaces of disc record 4' and inside surfaces 14 of cartridge 2 may adversely effect the operation of an optical system, for example, scratches or the like may be cut into the information surfaces of the disc to obliterate certain portions of an unrecorded or recorded disc.

Referring again to FIG. 2, the operation of finger members 8 will be explained. Disc record 4 is shown disposed in cartridge 2 with the information surface of disc record 4 spaced from the inside surfaces 14 of cartridge 2. Finger member 8 is provided with a V-shaped disc contacting surface 16. A complementary V-shaped rim 18 is provided on the outside rim of disc record 4. When finger member 8 engages the rim of disc record 4 the disc record 4 is suspended in the cavity of cartridge 2 such that the information surfaces of disc record 4 are substantially equally spaced from the inside surfaces 14 of cartridge 2. In FIG. 2, finger member 8 is shown having aperture 20 which is formed therethrough (illustratively, aperture 20 is round) aligned with aperture 22 which is formed through cartridge 4 (illustratively, aperture 22 is round and of the same diameter as aperture 20). In storage, finger member 8 is biased by spring 10 such that it slides into contact to press against the outside rim of disc record 4. Thus, the three finger members 8 contact the rim of disc record 4 to maintain appropriate spacing between the information surfaces of disc 4 and the inside surfaces of cartridge 2.

Figure 3:
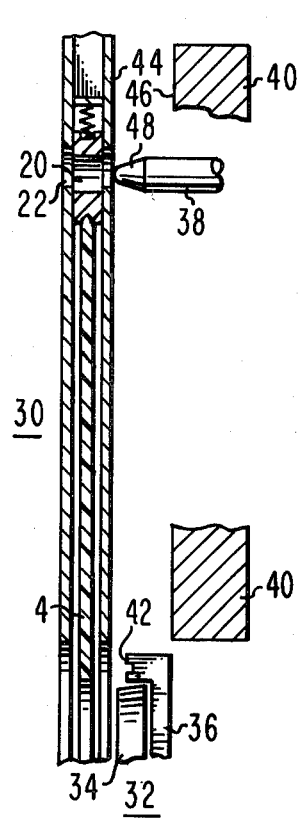
FIG. 3 is a cross-sectional side view of the protective cartridge and disc apparatus of FIG. 1 showing the disc and cartridge being inserted into a player.
Figure 4:
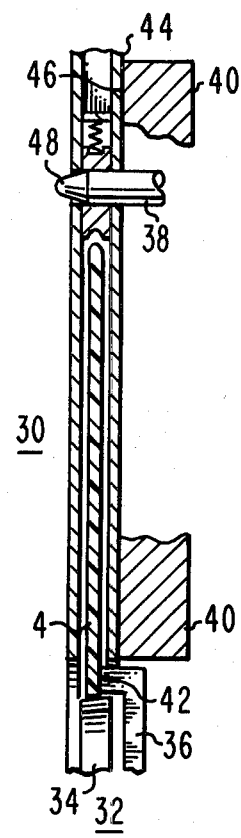
FIG. 4 is a cross-sectional side view of the protective cartridge and disc of FIG. 1 showing the disc and cartridge placed on an optical player.

Referring to FIGS. 3 and 4, the operation of the record package in an optical player will be explained. In FIG. 3, record package 30 is positioned in a loading position with respect to the spindle 32 of an optical player. Spindle 32 includes a hub member 34 and a hold-down member 36. In the loading position record package 30 is positioned just before pin 38 engages the aperture in the record package. (It will be noted that three pins would be provided in the optical player positioned to align the apertures in the cartridge with the apertures in the finger members.)

Referring to FIG. 4, the record package 30 is shown positioned on the spindle 32 against reference plate 40 with pin 38 inserted. As spindle 32 engages the spindle hole in disc 4, pin 38 engages and aligns the apertures through the cartridge. Pin 38 disengages the finger members from the outside rim of disc record 4. Pin member 38 is tapered on tip 48 such that as the pin enters aperture 22 the tapered tip 48 enters aperture 20. As record package 30 is pressed against reference plate 40 pin 38 aligns apertures 20 and 22. Spindle 32 includes hub member 34 which aligns the center of the disc record 4 with respect to the center of rotation of spindle 32. Hold-down member 36 engages an inside portion of disc record 4 by means of a vacuum provided around groove 42. Outside surface 44 of cartridge 4 is positioned against reference surface 46 of reference plate 40. With finger member 8 disengaged from the outside rim of disc record 4 spindle 32 may be driven by a motor (not shown) to rotate disc record 4.

What is claimed is:

1. A record package comprising:
    a disc record;
    an enclosure for protecting an information bearing surface of said disc record, said enclosure having a cavity for housing said disc record, said enclosure having a plurality of apertures of a predetermined shape formed therethrough; and
    a plurality of holding means, coupled to said enclosure, for holding said disc record such that said disc record is suspended in said cavity and said information bearing surface is spaced from a side surface of said enclosure, each of said plurality of holding means being slidably positioned in said enclosure and biased to engage the outside rim of said record disc to suspend said record disc in said cavity, each of said plurality of holding means having an aperture of said predetermined shape formed therethrough, respective ones of said plurality of apertures formed in said holding means being offset with respect to respective ones of said plurality of apertures formed in said enclosure when said plurality of holding means engage said outside rim of said record disc;
    pin means, arranged on means for utilizing said record package, said pin means engaging said record package such that respective ones of said plurality of apertures formed in said holding means are aligned with respect to respective ones of said plurality of apertures formed in said enclosure, said pin means disengaging said holding means from said outside rim of said record disc for sliding said plurality of holding means to disengage said record disc to permit said disc record to rotate within said cavity.

2. The record package according to claim 1 wherein said holding means includes finger members and wherein said finger members are biased into engagement with said disc record by springs.

3. The record package according to claim 2 wherein said outside rim of said record disc is V-shaped and wherein said finger members have V-shaped contacting portions that are complimentary to the V-shape of said rim, said V-shaped contacting portions of said finger members engaging said V-shaped rim such that said disc record is centered in said cavity.

4. The record package according to claim 3 wherein said predetermined shape of said apertures is round.

5. The record package according to claim 4 wherein said plurality of holding means is at least three.

6. A record package comprising:
a disc record having first and second side surfaces adapted for storing information;
an enclosure for protecting said first and second side surfaces of said disc record, said enclosure having a cavity for housing said disc record, said cavity being defined by inside surfaces of said enclosure, said enclosure having a plurality of apertures of a predetermined shape formed therethrough; and
a plurality of means for holding said disc record such that said disc record is suspended in said cavity and said first and second side surfaces of said disc record are spaced from said inside surfaces of said enclosure, each of said plurality of holding means being slidably positioned in said enclosure to move in a radial direction with respect to said disc record, each of said plurality of holding means being spring biased to engage the outside rim of said record disc, said plurality of holding means engaging the outside rim of said record disc to suspend said record disc in said cavity, each of said holding means having an aperture of said predetermined shape formed therethrough, respective ones of said plurality of apertures formed in said holding means being offset in said radial direction with respect to respective ones of said plurality of apertures formed in said enclosure when said plurality of holding means engage said outside rim of said record disc, pin means, provided on means for utilizing said record package, for insertion into said apertures, said pin means effecting a disengagement of said holding means such that said plurality of holding means slide in said radial direction to release said disc record so that said disc record is freed to rotate within said cavity.

7. The record package according to claim 6 wherein said holding means include finger members and wherein said finger members are biased into engagement with said disc record by springs.

8. The record package according to claim 7 wherein said outside rim of said record disc is V-shaped and wherein said finger members have V-shaped contacting portions that are complimentary to the V-shape of said rim, said V-shaped contacting portions of said finger members engaging said V-shaped rim such that said disc record is centered in said cavity.

9. The record package according to claim 8 wherein said predetermined shape of said apertures is round.

10. The record package according to claim 9 wherein said plurality of holding means is at least three.

* * * * *